United States Patent [19]

Nakaso et al.

[11] 4,374,108
[45] Feb. 15, 1983

[54] PROCESS OF PREPARING ALKALI MONOFLUOROPHOSPHATE

[75] Inventors: Yasuji Nakaso; Kyoji Tanaka, both of Ube; Hiromi Kawamoto, Onoda, all of Japan

[73] Assignee: Central Glass Company, Limited, Yamaguchi, Japan

[21] Appl. No.: 208,685

[22] Filed: Nov. 20, 1980

[30] Foreign Application Priority Data

Nov. 22, 1979 [JP] Japan .................. 54-150757

[51] Int. Cl.³ .............................. C01B 25/10
[52] U.S. Cl. .................... 423/301; 423/185; 423/300
[58] Field of Search ............... 423/301, 185, 300

[56] References Cited

U.S. PATENT DOCUMENTS

| | | | |
|---|---|---|---|
| 2,481,807 | 9/1949 | Anderson | 23/50 |
| 3,401,013 | 9/1968 | Rohifs et al. | 423/301 |
| 3,463,605 | 8/1969 | White et al. | 423/301 |
| 3,821,357 | 7/1974 | Cassidy et al. | 423/300 |

FOREIGN PATENT DOCUMENTS 1142687 2/1969 United Kingdom .
512171 6/1976 U.S.S.R. .

OTHER PUBLICATIONS

Mosier et al, "Fluorine Chemicals"; Ind. Eng. Chem., vol. 43, pp. 246-248 (1951).

*Primary Examiner*—Charles F. Warren
*Assistant Examiner*—Margaret B. Medley
*Attorney, Agent, or Firm*—Lowe, King, Price & Becker

[57] ABSTRACT

An alkali monofluorophosphate expressed by the formula $M_2PO_3F$, where M represents Na or K, can readily be synthesized under a relatively mild reaction condition by making HF gas contact with powdery or fine granular $M_4P_2O_7$ or $M_2HPO_4$ placed in a reaction vessel and maintained at a temperature in the range from about 200° C. to about 450° C., and more preferably in the range of 280°-360° C. It is suitable to make HF gas continuously flow into and pass through the reaction vessel until the total quantity of HF flowed into the vessel amounts to 100 to 150% of the theoretical value for conversion of $M_4P_2O_7$ or $M_2HPO_4$ to $M_2PO_3F$.

6 Claims, 10 Drawing Figures

PROCESS OF PREPARING ALKALI MONOFLUOROPHOSPHATE

BACKGROUND OF THE INVENTION

This invention relates to the synthesis of an alkali monofluorophosphate, and more particularly to a process of preparing sodium or potassium monofluorophosphate by reaction of sodium or potassium pyrophosphate, or disodium or dipotassium hydrogenphosphate, with hydrogen fluoride.

In the present application, the term "alkali monofluorophosphate" means a compound expressed by the formula $M_2PO_3F$, where M represents Na or K, and sometimes will be abbreviated to "MFP".

According to a method described in "Ind. Eng. Chem.", Vol. 43, 246–248 (1951), MFP is prepared by neutralizing monofluorophosphoric acid $H_2PO_3F$, which is formed by reaction between diphosphorus pentoxide and anhydrous hydrogen fluoride, by using an alkali metal salt. However, industrial applications of this method require the provision of high-grade and complicated apparatus and a great degree of skill in operation because of the use of highly toxic and corrosive materials and, hence, will suffer from high production costs.

In a different method, U.S. Pat. No. 2,481,807 discloses the preparation of MFP through melting of a mixture of a metaphosphate and an alkali fluoride. In this method, it is permissible to replace the metaphosphate by either a dihydrogenphosphate in the form of $MH_2PO_4$ or a dihydrogenpyrophosphate in the form of $M_2H_2P_2O_7$ which gives a metaphosphate at the temperature of the melting process. From an industrial viewpoint, this method is disadvantageous in that the reaction system must be heated to a temperature as high as 650°–700° C. and the melt formed in this process exerts errosive action on the reaction vessel with the inevitable result that considerable amounts of impurities intrude into the final product.

SUMMARY OF THE INVENTION

It is an object of the present invention to provide a novel process of preparing either sodium monofluorophosphate or potassium monofluorophosphate, which process can be performed in a simple and low-cost apparatus and under mild reaction conditions and, therefore, can easily be put into industrial practice with the possibility of greatly reducing the cost of production.

The present invention is based on the inventors' discovery that either an alkali pyrophosphate $M_4P_2O_7$ (M is Na or K) or a dialkali hydrogenphosphate $M_2HPO_4$ (M is NA or K) in solid phase readily reacts with HF at relatively low temperature to form an alkali monofluorophosphate.

According to the present invention, an alkali monofluorophosphate as herein defined is prepared by a process comprising the step of contacting hydrogen fluoride gas with a compound selected from the group consisting of sodium pyrophosphate, potassium pyrophosphate, disodium hydrogenphosphate and dipotassium hydrogenphosphate and maintaining the reaction at a temperature in the range from about 200° C. to about 450° C.

The fundamental reaction in this process can be expressed by either of the following equations (depending on the starting material), wherein M represents Na or K. In the case of using a pyrophosphate:

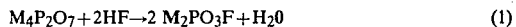

$$M_4P_2O_7 + 2HF \rightarrow 2\ M_2PO_3F + H_2O \quad (1)$$

In the case of using a hydrogenphosphate:

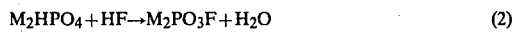

$$M_2HPO_4 + HF \rightarrow M_2PO_3F + H_2O \quad (2)$$

In this process, the starting alkali pyrophosphate or dialkali hydrogenphosphate is used in a powdery or fine granular form, and hydrogen fluoride gas is made to contact with the heated starting material substantially at atmospheric pressure. In practice, the contact of hydrogen fluoride gas with the alkali pyrophosphate or dialkali hydrogen phosphate is performed by placing the alkali compound in a reaction vessel and making hydrogen fluoride gas continuously flow into and pass through the reaction vessel at such a rate and for such a period of time that the total quantity of hydrogen fluoride gas flowed into the vessel amounts to 100 to 150% of the theoretical value according to Equation (1) or (2). To maximize the yield of MFP, preferably the aforementioned reaction temperature would be made to ranges from 280° C. to 360° C.

DESCRIPTION OF THE PREFERRED EMBODIMENTS

Figure 1:
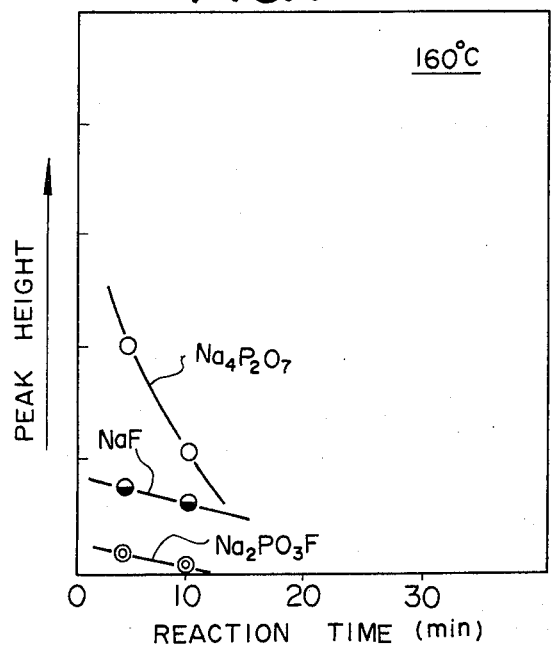
FIG. 1 to 6 are charts showing the results of a series of experiments in which HF gas was made to contact with $Na_4P_2O_7$ at six different temperatures, respectively.

As stated hereinbefore, the preparation of MFP according to the present invention is practically accomplished by making HF gas continuously flow into and pass through a reaction vessel in which is placed either $M_4P_2O_7$ or $M_2HPO_4$ (initially in the form of powder or fine granules) and maintained at a temperature determined to be within the range from about 200° C. to about 450° C. and within this temperature range, there is a narrower optimum range which enhances of the yield of MFP.

These temperature ranges were determined based on the results of thorough experiments carried out in the course of completing this invention. The charts of the accompanying drawings show some of the experimental results.

First, the reaction between $Na_4P_2O_7$ and HF will be explained with reference to FIGS. 1–6. Used as the starting material was fine granular $Na_4P_2O_7$ about 100 microns in particular size. A suitable quantity of this $Na_4P_2O_7$ was put into a reaction vessel provided with a stirring mechanism, and HF was made to continuously flow into and pass through the reaction vessel at a constant rate of 0.02 moles per minute for 0.1 mole of $Na_4P_2O_7$ for a variable period of time (up to 30 min), while the reaction system in the vessel was maintained at a selected temperature and subjected to continuous stirring. The manner of changes in the amounts of the starting material, MFP and by-products in the reaction product with the length of reaction time (the duration of the contact of the flowing HF gas with the material in the vessel) was examined by X-ray analysis. On each chart of the drawing figures, the ordinate indicates peak heights of characteristic diffraction lines in X-ray diffraction pattern.

When the experimental fluorination of $Na_4P_2O_7$ by HF gas was performed at 160° C., the results were as shown in FIG. 1. As can be seen, not only MFP ($Na_2PO_3F$) but also sodium fluoride NaF were formed by a simultaneous reaction, and, quite unfavorably, NaF was formed in a larger amount than MFP.

Figure 2:
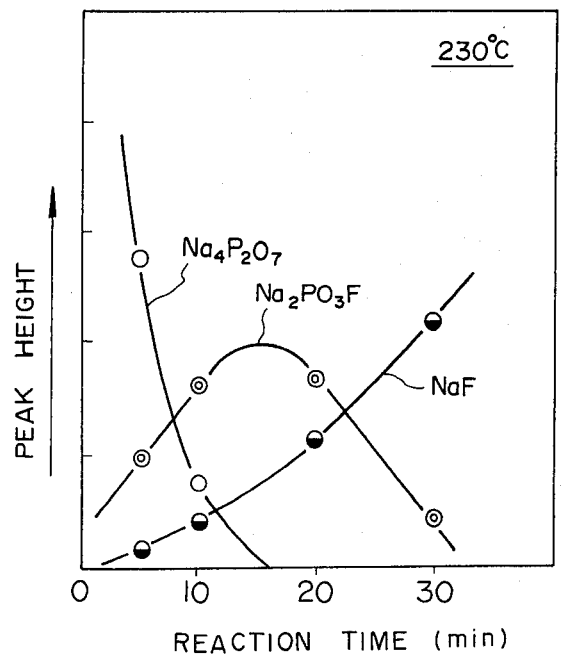
Figure 3:
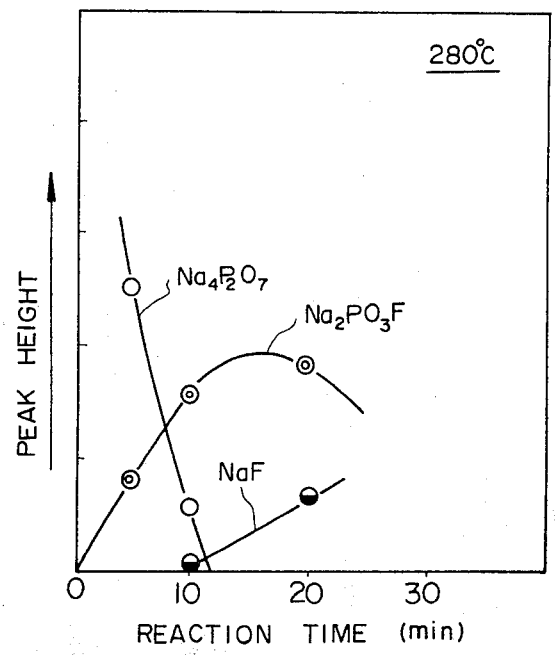
Figure 4:
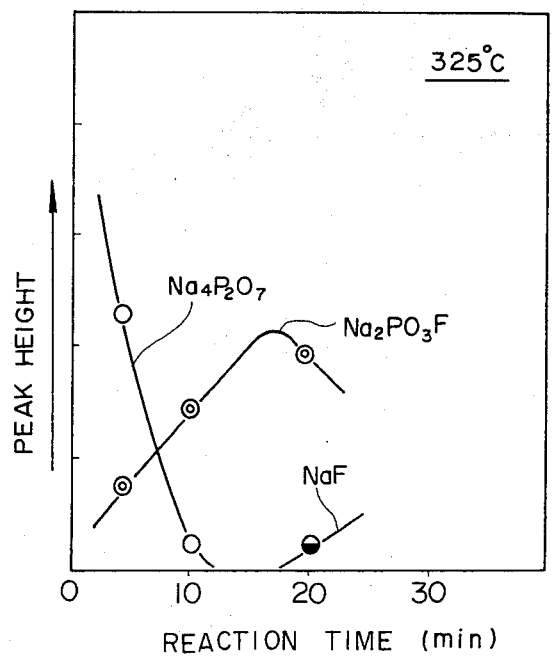
Figure 5:
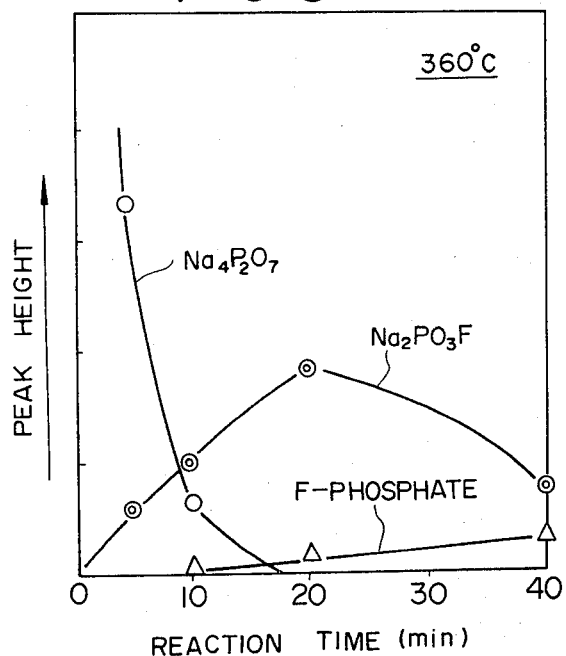

When the reaction temperature exceeded 200° C. as represented by the results at 230° C., as shown in FIG. 2, MFP was formed in a larger quantity than NaF, and there was a tendency for the amount of NaF to increase as the reaction time is extended. This tendency was observed also when the reaction temperature was further raised as shown in FIG. 3 (280° C.) and FIG. 4 (325° C.), but at these temperatures the amount of NaF greatly decreased.

Figure 6:
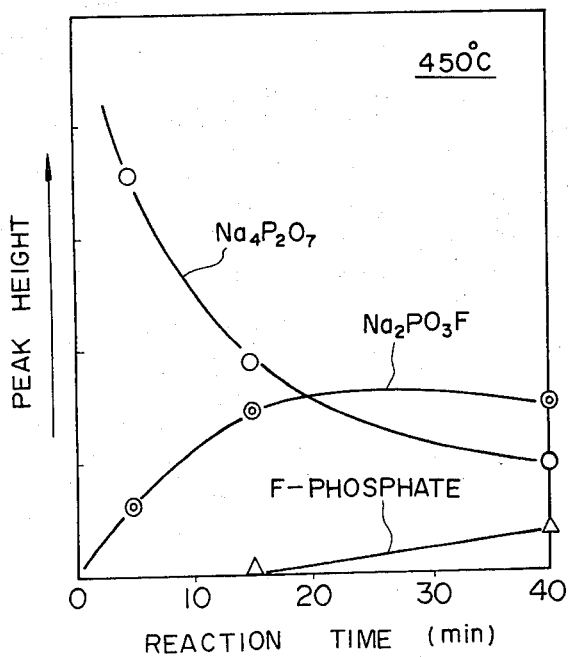

At 360° C. (FIG. 5), the formation of NaF became negligible. At such an elevated temperature, however, there appeared to be a tendency for an amorphous fluorophosphate other than $Na_2PO_3F$ to be formed and the amount of this amorphous fluorophosphate gradually increased when the inflow of HF was continued even after near-completion of the MFP-forming reaction, meaning the occurrence of further fluorination of MFP. When the reaction temperature was as high as 450° C., as shown in FIG. 6, the formation of $Na_2PO_3F$ proceeded at a considerably lowered rate, and there was an increasing tendency towards the formation of amorphous fluorophosphate.

The above explained effects of the reaction temperature were generally similar also when $K_4P_2O_7$ was used as the starting material.

Thus, the experimental results presented in FIGS. 1–6 show that the synthesis of $Na_2PO_3F$ can be achieved most efficiently and with highest yield by the employment of a reaction temperature in the neighborhood of 325°–360° C. and by adequately determining the length of reaction time.

FIGS. 7–10 show experimental results with respect to the reaction between $Na_2HPO_4$ and HF. A suitable quantity of fine granular $Na_2HPO_4$ about 100 microns in particle size was put into the aforementioned reaction vessel, and HF was made to continuously flow into and pass through the reaction vessel at a constant rate of 0.01 mole per minute for 0.1 mole of $Na_2HPO_4$ for a variable length of time, while the reaction system in the vessel was maintained at a selected temperature and subjected to continuous stirring.

Figure 7:
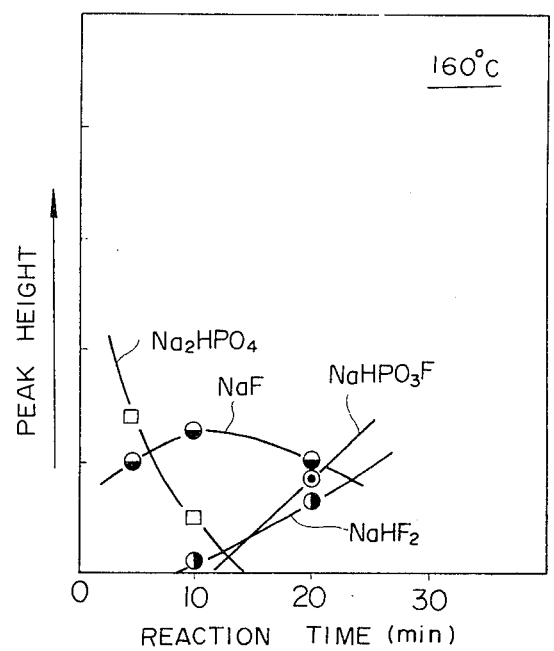
FIGS. 7 to 10 are charts showing the results of a series of similar experiments in which $Na_2HPO_4$ was used in place of $Na_4P_2O_7$.

When the reaction temperature was as low as 160° C., as shown in FIG. 7, the X-ray analysis revealed that MFP was formed only in small amounts.

Figure 8:
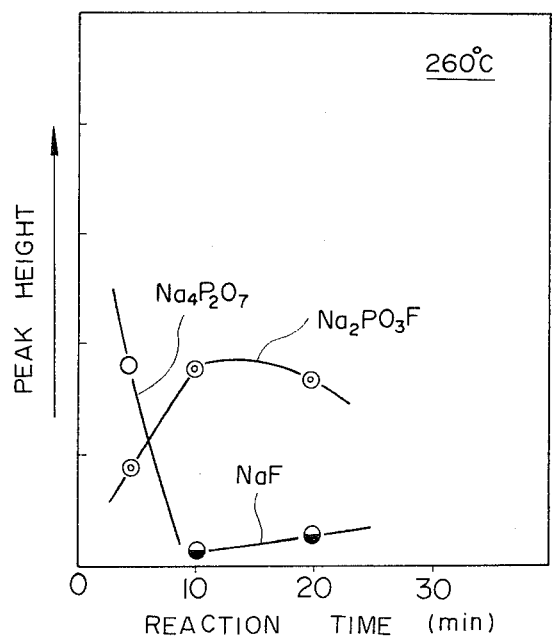
Figure 9:
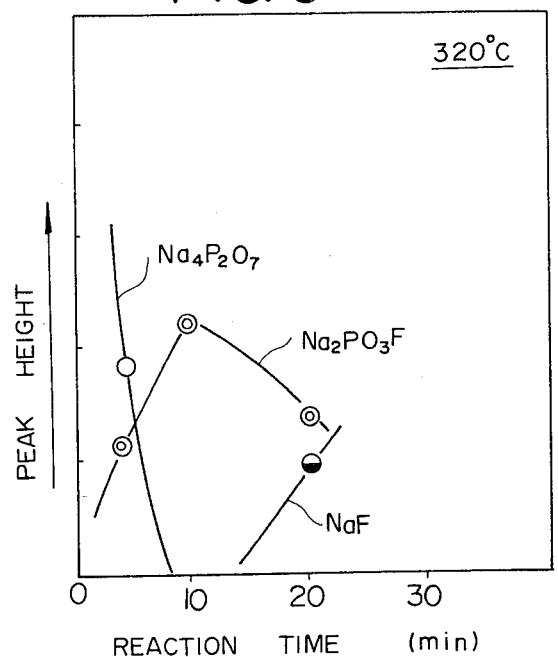
Figure 10:
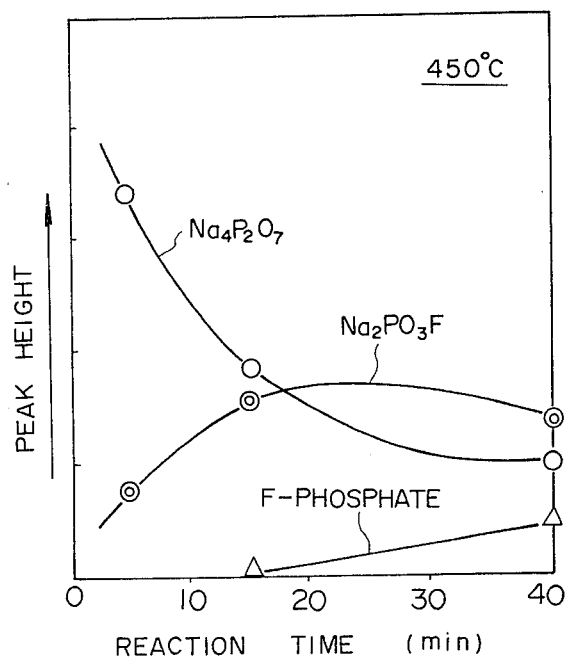

When the reaction temperature was 260° C., 320° C. and 450° C., as respectively shown in FIGS. 8, 9 and 10, variations in the rate of formation of MFP and the amount of formed NaF and formation of amorphous fluorophosphate at 450° C. were generally similar to the case of fluorinating $Na_4P_2O_7$ at the corresponding reaction temperatures. (In FIGS. 8–10, the curves representing the starting material are indicated as $Na_4P_2O_7$ because $Na_2HPO_4$ is converted to $Na_4P_2O_7$ at the indicated temperatures before it undergoes fluorination.) Therefore, the reaction temperature in the process of the invention is specified to be in the range from about 200° C. to about 450° C.

Also taking into consideration the results of similar experiments carried out at still different temperatures, we have confirmed that the fluorination reaction according to the invention proceeds most readily and gives the highest purity MFP by maintaining the reaction temperature within a narrower range of 280°–360° C.

If the inflow of HF into the reaction vessel in the process of the invention is continued too long, that is, even after practical completion of formation of MFP, there is the possibility of the formed MFP undergoing further fluorination to give undesirable by-products, as mentioned hereinbefore. For example, such an excessive fluorination reaction may be expressed by the following equation.

$$Na_2PO_3F + 2HF \rightarrow NaPO_2F_2 + NaF + H_2O \qquad (3)$$

Therefore, it is preferable to terminate the inflow of HF into the reaction vessel in the process of the invention when the total quantity of HF flowed into the reaction vessel amounts to 100–150% of the theoretical value according to Equation (1) or (2). A suitable rate of flow of HF in this process falls within the range from about 0.4 mole/hr to about 4.0 mole/hr for 1.0 mole of $Na_4P_2O_7$ or $K_4P_2O_7$, and within the range from about 0.2 mole/hr to about 2.0 mole/hr for 1.0 mole of $Na_2HPO_4$ or $K_2HPO_4$.

In performing a process according to the invention, especially on an industrial scale, it is preferred to preheat hydrogen fluoride just before introduction into the reaction vessel to a temperature in the range from about 100° C. to the selected reaction temperature in the reaction vessel.

The following examples are presented to further illustrate the present invention.

EXAMPLE 1

Used as the starting material was 1.0 mole of fine granular $Na_4P_2O_7$ about 100 microns in particle size. Synthesis of sodium monofluorophosphate was carried out in a reaction vessel, which was made of nickel, one liter in capacity and provided with a stirrer (the same reaction vessel was used also in the following Examples 2–10), by putting the entire quantity (1 mole) of this $Na_4P_2O_7$ into the reaction vessel and making HF continuously flow into and pass through the reaction vessel at a constant rate of 0.6 moles per hour for a period of 3.8 hours, maintaining the reaction system in the vessel at a temperature of 320° C. and continuing sufficient stirring.

Analysis of the product (in regard to the solid component) of this process gave the following results. The measurement of pH was performed by using a solution of 2 g of the product in 100 g of de-ionized water. (The same method was employed also in the following examples.)

$Na_2PO_3F$ ... 98.04% (by weight)
Heavy Metals ... less than 5 ppm
pH ... 7.0
By calculation, the percentage of the reacted portion of HF was 87.7%.

EXAMPLE 2

This example was generally similar to the process of Example 1, except that HF was made to flow into and pass through the reaction vessel (0.6 mole/hr) for a period of 3.5 hours and the reaction system in the vessel was maintained at 230° C. during this time period.

Analysis of the product gave the following results.

Na$_2$PO$_3$F ... 80.02%
Heavy Metals ... less than 5 ppm
pH ... 6.5

The reacted portion of HF was calculated to be 95.2%.

EXAMPLE 3

This example was generally similar to the process of Example 1, but in this case HF was made to flow into and pass through the reaction vessel (0.6 mole/hr) for a period of 4.0 hours and the reaction system in the vessel was maintained at 400° C. during this time period.

Analysis of the product gave the following results.
Na$_2$PO$_3$F ... 90.52%
Heavy Metals ... less than 5 ppm
pH ... 7.5

The reacted portion of HF was calculated to be 83.3%.

EXAMPLE 4

This example, too, was generally similar to the process of Example 1, but HF was made to flow into and pass through the reaction vessel (0.6 mole/hr) for 4.5 hours as the sole modification.

Analysis of the product gave the following results.
Na$_2$PO$_3$F ... 97.01%
Heavy Metals ... less than 5 ppm
pH ... 7.1

The reacted portion of HF was calculated to be 74.1%

EXAMPLE 5

Also this example was generally similar to the process of Example 1, except that HF was made to flow into and pass through the reaction vessel at a constant rate of 1.5 mole per hour for a period of 1.7 hours.

The results of analysis of the product were as follows.
NaHd 2PO$_3$F ... 96.31%
Heavy Metals ... less than 5 ppm
pH ... 7.2

The reacted portion of HF was calculated to be 78.4%.

EXAMPLE 6

Used as the starting material was 1.0 mole of fine granular K$_4$P$_2$O$_7$ about 100 microns in particle size. The entire quantity of this K$_4$P$_2$O$_7$ was put into the reaction vessel, and synthesis of potassium monofluorophosphate was carried out by making HF continuously flow into and pass through the reaction vessel at a constant rate of 1.5 mole per hour for a period of 2 hours, maintaining the reaction system in the vessel at a temperature of 320° C. and continuing sufficient stirring.

Analysis of the product (in regard to solid component) of this process gave the following results.
K$_2$PO$_3$F ... 97.22%
Heavy Metals ... less than 5 ppm
pH ... 7.5

The reacted portion of HF was calculated to be 77.9%.

EXAMPLE 7

Used as the starting material was 2.0 moles of fine granular Na$_2$HPO$_4$ about 100 microns in particle size. The entire quantity of this Na$_2$HPO$_4$ was put into the reaction vessel, and synthesis of sodium monofluorophosphate was carried out by making HF continuously flow into and pass through the reaction vessel at a constant rate of 0.6 mole per hour for a period of 3.7 hours, maintaining the reaction system in the vessel at a temperature of 300° C. and continuing sufficient stirring.

Analysis of the product (in regard to solid component) of this process gave the following results.
Na$_2$PO$_3$F ... 97.05%
Heavy Metals ... less than 5 ppm
pH ... 6.9

By calculation, the percentage of the reacted portion of HF was 90.1%.

EXAMPLE 8

This example was generally similar to the process of Example 7, but in this case HF was made to flow into and pass through the reaction vessel (0.6 mole/hr) for a period of 3.6 hours and the reaction system in the vessel was maintained at 230° C. during this time period.

The results of analysis of the product were as follows.
Na$_2$PO$_3$F ... 81.03%
Heavy Metals ... less than 5 ppm
pH ... 7.0

The reacted portion of HF was calculated to be 92.6%.

EXAMPLE 9

This example, too, was generally similar to the process of Example 7, but in this case HF was made to flow into and pass through the reaction vessel (0.6 mole/hr) for a period of 3.9 hours and the reaction system in the vessel was maintained at 390° C.

Analysis of the product gave the following results.
Na$_2$PO$_3$ F ... 88.90%
Heavy Metals ... less than 5 ppm
pH ... 7.4

The reacted portion of HF was calculated to be 85.5%.

EXAMPLE 10

Used as the starting material was 2.0 moles of fine granular K$_2$HPO$_4$ about 100 microns in particle size. The entire quantity of this K$_2$HPO$_4$ was put into the reaction vessel, and synthesis of potassium monofluorophosphate was carried out by making HF continuously flow into and pass through the reaction vessel at a constant rate of 0.6 moles per hour for a period of 3.5 hours, maintaining the reaction system in the vessel at a temperature of 390° C. and continuing sufficient stirring.

Analysis of the product gave the following results.
K$_2$PO$_3$F ... 89.90%
Heavy Metals ... less than 5 ppm
pH ... 7.3

The reacted portion of HF was calculated to be 82.3%.

What is claimed is:

1. A process for the preparation of an alkali monofluorophosphate expressed by the formula M$_2$PO$_3$F, where M represents Na or K, by a process comprising reacting hydrogen fluoride gas with an alkali phosphate selected from the group consisting of sodium pyrophosphate, potassium pyrophosphate, disodium hydrogenphosphate and dipotassium hydrogenphosphate, the steps of the process comprising: placing said alkali phosphate in a finely divided solid form in a reaction vessel and contacting with the hydrogen fluoride gas by continuously flowing the hydrogen fluoride gas into and through said vessel until the total quantity of hydrogen fluoride gas flowed into said vessel amounts to 100 to 150% of the theoretical value for conversion of said alkali phosphate to $M_2PO_3F$, while maintaining the temperature of the reaction in the range of from about 200° C. to about 450° C.

2. A process according to claim 1, wherein hydrogen fluoride gas is contacted with said alkali phosphate at substantially atmospheric pressure.

3. A process according to claims 1 or 2, wherein said temperature is in the range from 280° C. to 360° C.

4. A process according to claims 1 or 2, wherein said alkali phosphate is selected from the group consisting of sodium pyrophosphate and potassium pyrophosphate, and said hydrogen fluoride gas is made to flow into said vessel at a rate in the range from about 0.4 mole/hr. to about 4.0 mole/hr. for 1.0 mole of said alkali phosphate.

5. A process according to claims 1 or 2, wherein said alkali phosphate is selected from the group consisting of disodium hydrogenphosphate and dipotassium hydrogenphosphate, and said hydrogen fluoride gas is made to flow into said vessel at a rate in the range from about 0.2 mole/hr. to about 2.0 mole/hr. for 1.0 mole of said alkali phosphate.

6. A process according to claims 1 or 2, further comprising the step of preheating said hydrogen fluoride gas prior to introduction into said reaction vessel to a temperature in the range from about 100° C. to said reaction temperature.

* * * * *